(12) United States Patent
Lan et al.

(10) Patent No.: US 10,390,230 B2
(45) Date of Patent: Aug. 20, 2019

(54) MAC DELIMITER ENHANCEMENT FOR SPATIAL REUSE

(71) Applicant: AVAGO TECHNOLOGIES INTERNATIONAL SALES PTE. LIMITED

(72) Inventors: Zhou Lan, Irvine, CA (US); Matthew Fischer, Irvine, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 22 days.

(21) Appl. No.: 15/691,082

(22) Filed: Aug. 30, 2017

(65) Prior Publication Data

US 2018/0063718 A1     Mar. 1, 2018

Related U.S. Application Data

(60) Provisional application No. 62/381,920, filed on Aug. 31, 2016.

(51) Int. Cl.
| | |
|---|---|
| *H04W 16/10* | (2009.01) |
| *H04L 5/00* | (2006.01) |
| *H04W 52/24* | (2009.01) |
| *H04W 8/00* | (2009.01) |
| *H04W 88/08* | (2009.01) |
| *H04W 84/12* | (2009.01) |

(52) U.S. Cl.
CPC ............ *H04W 16/10* (2013.01); *H04L 5/006* (2013.01); *H04W 8/005* (2013.01); *H04W 52/245* (2013.01); *H04W 52/243* (2013.01); *H04W 84/12* (2013.01); *H04W 88/08* (2013.01)

(58) Field of Classification Search
CPC ... H04W 52/243; H04W 16/10; H04W 8/005; H04W 88/08; H04W 84/12; H04W 52/245; H04W 52/24; H04L 5/006; H04L 5/00
USPC .................................................. 370/329, 338
See application file for complete search history.

(56) References Cited

U.S. PATENT DOCUMENTS

| | | | | |
|---|---|---|---|---|
| 9,749,967 | B2 * | 8/2017 | Wang | H04W 52/241 |
| 9,991,996 | B2 * | 6/2018 | Chu | H04L 5/003 |
| 10,111,226 | B2 * | 10/2018 | Barriac | H04W 72/0453 |
| 10,116,360 | B2 * | 10/2018 | Seok | H04B 7/0452 |
| 2017/0142659 | A1 * | 5/2017 | Noh | H04W 52/0245 |
| 2017/0230837 | A1 * | 8/2017 | Huang | H04W 80/02 |

(Continued)

OTHER PUBLICATIONS

James Wang, et al., Adaptive CCA and TPC, IEEE 802.11-15/1069r3, Sep. 12, 2015, 21 pages.

(Continued)

*Primary Examiner* — Man U Phan
(74) *Attorney, Agent, or Firm* — Xsensus LLP

(57) ABSTRACT

A device includes circuitry that identifies one or more basic service sets (BSSs) that include at least one access point (AP) and one or more corresponding stations (STA) associated with an extended service set (ESS) based on one or more location or configuration parameters. The circuitry also determines ESS color information associated with the one or more BSSs of the ESS, and transmits a physical layer convergence protocol (PLCP) protocol data unit (PPDU) to the one or more BSSs that includes an enhanced MPDU delimiter indicating at least one of the ESS color information, BSS color information, or spatial reuse parameters (SRPs).

18 Claims, 12 Drawing Sheets

(56) References Cited

U.S. PATENT DOCUMENTS

| | | | |
|---|---|---|---|
| 2017/0255659 A1* | 9/2017 | Cariou | G06F 17/30324 |
| 2018/0007689 A1* | 1/2018 | Patil | H04L 69/22 |
| 2018/0027573 A1* | 1/2018 | Cariou | H04W 72/085 |
| | | | 370/329 |
| 2018/0062805 A1* | 3/2018 | Huang | H04L 5/0044 |
| 2018/0084554 A1* | 3/2018 | Chu | H04L 5/0007 |
| 2018/0132109 A1* | 5/2018 | Lim | H04L 1/00 |
| 2018/0249501 A1* | 8/2018 | Ko | H04L 27/26 |

OTHER PUBLICATIONS

Laurent Cariou, et al., IEEE P802.11, Wireless LANs, Proposed Text Changes for OBSS_PD-based SR parameters, IEEE 802.11-16/0947r21, Jan. 18, 2017, 14 pages.

Thomas Derham, et al., Intra-ESS Spatial Reuse using OBSS_PD, DensiFi, Aug. 26, 2016, 15 pages.

Part 11: Wireless LAN Medium Access Control (MAC) and Physical Layer (PHY) Specifications, IEEE Computer Society, IEEE Std 802.11™-2016, Dec. 7, 2016, 3534 pages.

* cited by examiner

| Element ID | Length | Element ID Extension | OBSS_PDmin_offset | OBSS_PDmax_offset | SRP-based RS parameters | Intra-ESS BSS List |
|---|---|---|---|---|---|---|
| 1 | 1 | | 1 | 1 | 1 | variable |

Octets:

FIG. 6A

| Element ID | Length | BSSID | BSS Color |
|---|---|---|---|
| 1 | 1 | 6 | 1 |

Octets:

FIG. 6B

MAC DELIMITER ENHANCEMENT FOR SPATIAL REUSE

CROSS-REFERENCE TO RELATED APPLICATIONS

This application claims the benefit of U.S. Provisional Application No. 62/381,920 entitled "MAC Delimiter Enhancement for Spatial Reuse", and filed Aug. 31, 2016. The entire contents of this provisional application are hereby incorporated by reference.

BACKGROUND

Technical Field

The present disclosure relates generally to communication systems; and, more particularly, to channel sharing and concurrent communications within single user, multiple users, multiple access, and/or MIMO wireless communications.

Description of the Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into RF signals that are transmitted to a RX that includes two or more antennae and two or more RX paths.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 6A is an exemplary diagram of a spatial reuse parameter set element;

FIG. 6B is an exemplary diagram of an intra-ESS BSS identifier element;

DETAILED DESCRIPTION

In a wireless local area network (WLAN) system in which a central controller makes decisions about which device may access the medium, resources are allocated after consideration of competing resource requests from participating stations (STAs). The central controller (e.g., access point) provides resource units for each given phase of data exchange, where each phase of data exchange may provide resource units to more than one participating station (STA) corresponding to a single window of time. The resource units for different STAs are orthogonal through various means, e.g. frequency orthogonal, spatially orthogonal, etc. In each of the allocated resource units, an access point (AP) or a non-AP STA may transmit an aggregated media access control (MAC) protocol data unit (A-MDPU) in a single user physical layer convergence protocol (PLCP) protocol data unit (PPDU) or multi-user PPDU to the intended recipient STA for efficiency improvement. The allocated resource unit can be a fragment or a whole operating channel of the AP. In some implementations, an AP with all associated STAs can be referred to as a basic service set (BSS).

During the period of time of such PPDU transmissions, another pair of STAs in a different BSS, such as an overlapping BSS (OBSS), may transmit if the generated interference is under a predetermined level, which is referred to as spatial reuse (SR). Aspects of the present disclosure are directed to facilitating SR operations by modifying MPDU delimiter content to deliver SR-related parameters. This, for example, can include modifying an existing MPDU delimiter that is used by legacy STAs. The modifications to the MPDU delimiter content allow BSS color, extended service set (ESS) color, and SR reuse parameters to be included and also provide frame check sequence (FCS) field design considerations for legacy STA coexistence.

Figure 1:
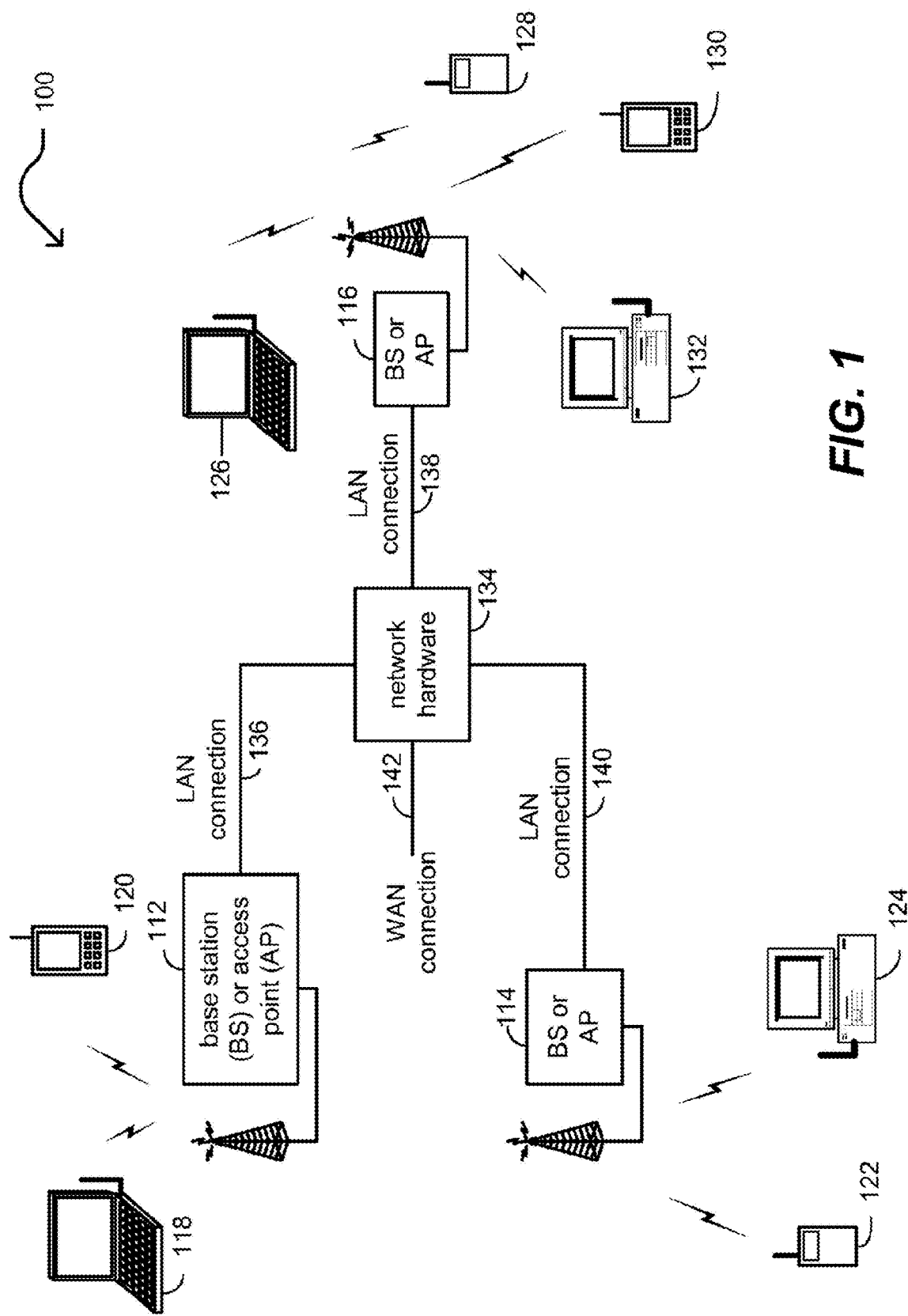
FIG. 1 is a diagram illustrating an implementation of a wireless communication system.

FIG. 1 is a diagram illustrating one or more implementations of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. The details of an implementation of such wireless communication devices are described in greater detail with reference to FIG. 2.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include at least a processor and a communication interface to support communications with any other of the wireless communication devices 118-132 and BSs or APs 112-116. As one of ordinary skill would recognize the processor and communication interface may be implemented as discrete circuit components, such as transistors, logic gates, amplifiers, etc., or may be implemented as a single integrated circuit (IC) or system on a chip (SoC). Thus, the specific implementation of the circuitry of these devices is not limiting on the present disclosure.

In an example of operation, a processor implemented within one of the devices (e.g., any one of the WDEVs 118-132 and BSs or APs 112-116) is configured to process a first signal received from another one of the devices (e.g., any other one of the WDEVs 118-132 and BSs or APs 112-116) to determine one or more concurrent transmission parameters. The processor then generates a second signal based on those one or more concurrent transmission parameters and directs a communication interface of the device to transmit the second signal during receipt of the first signal. The first signal that is detected or received includes one or more concurrent transmission parameters therein. These one or more concurrent transmission parameters may be explicitly signaled within the first signal or determined implicitly based on one or more characteristics of the first signal. The communication interface of the device receives the first signal from a first other device, and transmits the second signal to a second other device.

The device is configured to transmit the second signal to the second other device during transmission of the first signal by the first other device. The one or more concurrent transmission parameters included within the first signal provide information by which the device can make the transmission of the second signal. In exemplary aspects, a trade-off may be made in terms of how much interference the first signal can tolerate in comparison to how much protection the second signal will need. The device may then begin transmitting the second signal during the time in which the first other device is transmitting the first signal based on the one or more concurrent transmission parameters.

Figure 2:
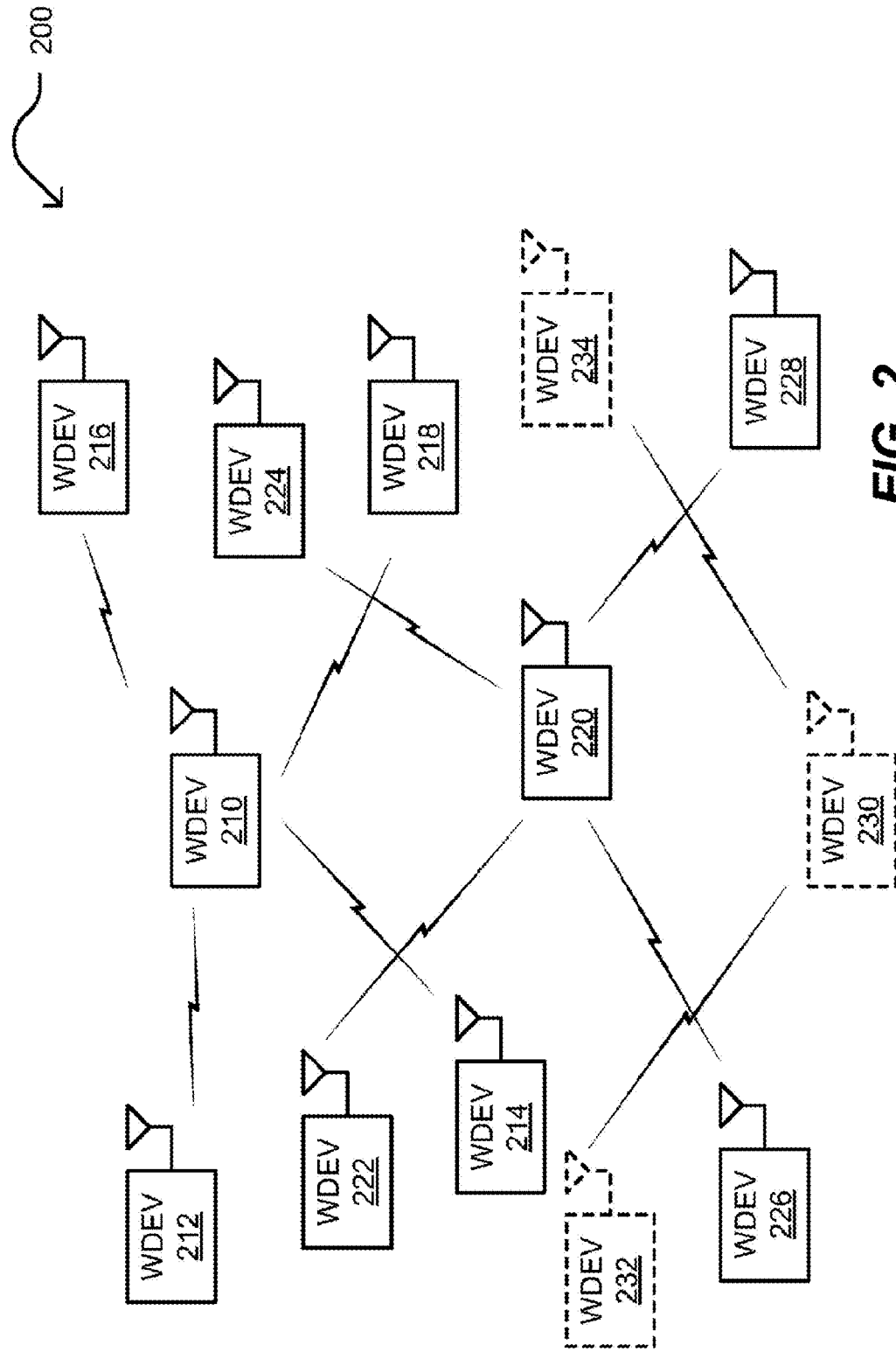
FIG. 2 is a diagram illustrating an implementation of dense deployment of wireless communication devices.

FIG. 2 is a diagram illustrating an implementation 200 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, one or more additional APs or AP-operative STAs may be deployed, such as WDEV 230 that communicates with WDEVs 232 and 234 that are STAs. The STAs may be any type of wireless communication devices such as wireless communication devices 118-132, and the APs or AP-operative STAs may be any type of wireless communication devices such as BSs or APs 112-116. Different groups of the WDEVs 210-234 may be partitioned into different basic services sets (BSSs). In some instances, one or more of the WDEVs 210-234 are included within one or more overlapping basic services sets (OBSSs) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc., that allow for improved spatial re-use (SR) for next generation WiFi (e.g., IEEE 802.11ax) or wireless local area network (WLAN) systems. Next generation WiFi systems are expected to improve performance in dense deployments where many clients and AP are packed in a given area (e.g., which may be a relatively area [indoor or outdoor] with a high density of devices, such as a train station, airport, stadium, building, shopping mall, etc., to name just some examples). Operating a large numbers of devices within a given area can be problematic if not impossible using conventional technologies.

Within such wireless systems, communications may be made using orthogonal frequency division multiplexing (OFDM) and/or orthogonal frequency division multiple access (OFDMA) signaling. OFDM's modulation may be viewed a dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and frames. Typically, the frequency responses of these sub-carriers are non-overlapping and orthogonal. Each sub-carrier may be modulated using any of a variety of modulation coding techniques. Comparing OFDMA to OFDM, OFDMA is a multi-user version of the OFDM signaling scheme. Multiple access is achieved in OFDMA by assigning subsets of subcarriers to individual recipient devices or users. For example, first sub-carrier(s)/tone(s) may be assigned to a user 1, second sub-carrier(s)/tone(s) may be assigned to a user 2, and so on up to any desired number of users.

In the context of such a dense deployment of wireless communication devices, any one of the WDEVs 210-234 may be implemented to include a processor that is configured to process a first signal received from another one of the devices (e.g., any other one of the WDEVs 210-234) to determine one or more concurrent transmission parameters. Note that this first signal may be intended for a particular one of the WDEVs 210-234 and yet may be detected or received by one or more other of the WDEVs 210-234. The processor of a WDEV that may not be specifically designated as a recipient of the first signal then generates a second signal based on those one or more concurrent transmission parameters and directs a communication interface of the device to transmit the second signal during receipt of the first signal.

Examples of such concurrent transmission parameters may include information corresponding to at least one of a modulation type, a coding type, a modulation coding set (MCS), a transmit or receive power level, a duration of the first signal, a frame type of the first signal, uplink or downlink indication, an interference margin level, a basic services set (BSS) identifier, a transmitter or receiver identifier, a number of spatial streams, a number or transmitter or receiver antennae, symbol timing and carrier frequency offset, a concurrent transmission start time, a concurrent transmission end time, and a carrier sense threshold. Any one or more of these concurrent transmission parameters may be indicated explicitly within the first signal or determined by processing the first signal. For example, any one of the one or more concurrent transmission parameters may be determined implicitly by processing the first signal. The one or more concurrent transmission parameters may be characteristics or features of the first signal, and a device's processor may be configured to determine those parameters implicitly by analyzing the characteristics or features of the first signal.

Figure 3:
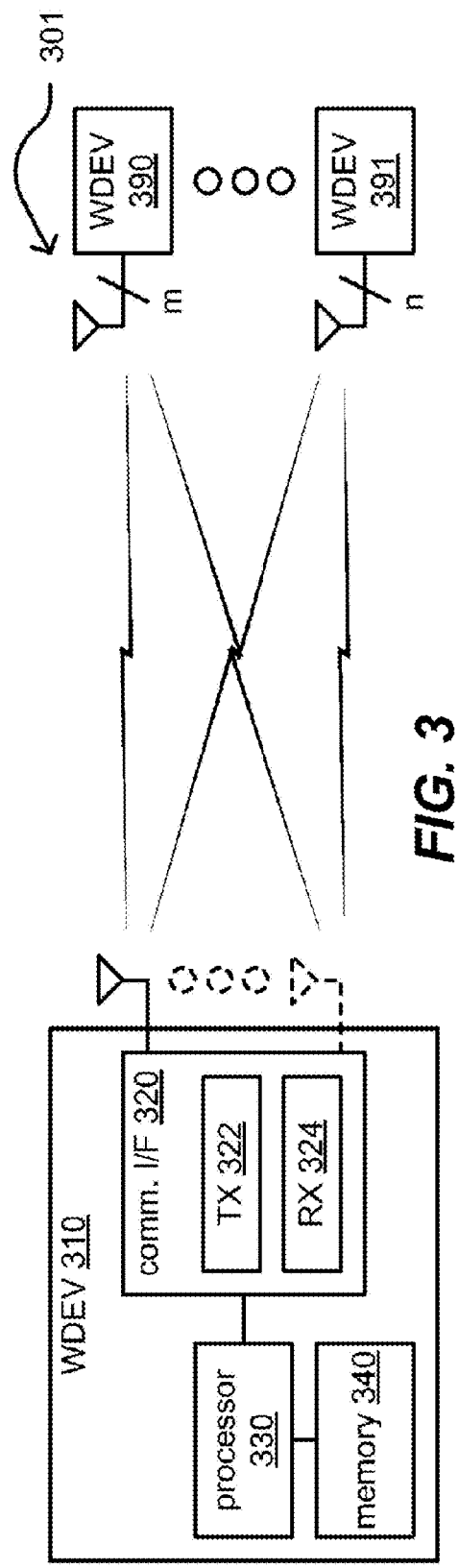
FIG. 3 is a diagram illustrating an example of communication between wireless communication devices.

FIG. 3 is a diagram illustrating an example 301 of communication between wireless communication devices. A wireless communication device 310 (e.g., which may be any one of devices 118-132 as with reference to FIG. 1) is in communication with another wireless communication device 390 via a transmission medium. The wireless communication device 310 includes a communication interface 320 to perform transmitting and receiving of one or more frames (e.g., using a transmitter 322 and a receiver 324). The wireless communication device 310 also includes a processor 330 with circuitry configured to execute one or more software instructions, and an associated memory 340 (such as RAM, ROM, EEPROM, FLASH, etc.), to execute various operations including interpreting one or more frames transmitted to wireless communication device 390 and/or received from the wireless communication device 390 and/or wireless communication device 391. The wireless communication devices 310 and 390 may be implemented using one or more integrated circuits in accordance with any desired configuration or combination or components, modules, etc. within one or more integrated circuits. Also, the wireless communication devices 310, 390, and 391 may each include more than one antenna for transmitting and receiving of one or more frames (e.g., WDEV 390 may include m antennae, and WDEV 391 may include n antennae).

In some examples, high SR gains can be achieved in dense managed networks (DMN). Where there is a high AP density, there is also a high link received signal strength indicator (RSSI) distribution, which results in an increased tolerance to interference, such as at "modern" stadiums, some enterprise and high-density public spaces, etc. In cases where OA-CCA cannot be used (e.g., SRP unavailable), IEEE 802.11ax devices use an OBSS_PD to provide SR gains. In one implementation, default OBSS_PD Max/Min=−62/−82 dBm. The AP can set non-default OBSS_PD Max/Min under predetermined conditions.

In some aspects, the OBSS_PD cannot differentiate between "same network OBSS" and "different network OBSS" transmissions. DMNs often coexist co-channel with other (managed/unmanaged) networks that cannot tolerate the interference levels that would provide optimal SR within the DMN. If DMN operators raise OBSS_PD above default levels to optimize their own SR, they may substantially impact the performance of other coexisting networks (e.g., reduction in range/coverage due to increased effective interference floor).

Figure 4:
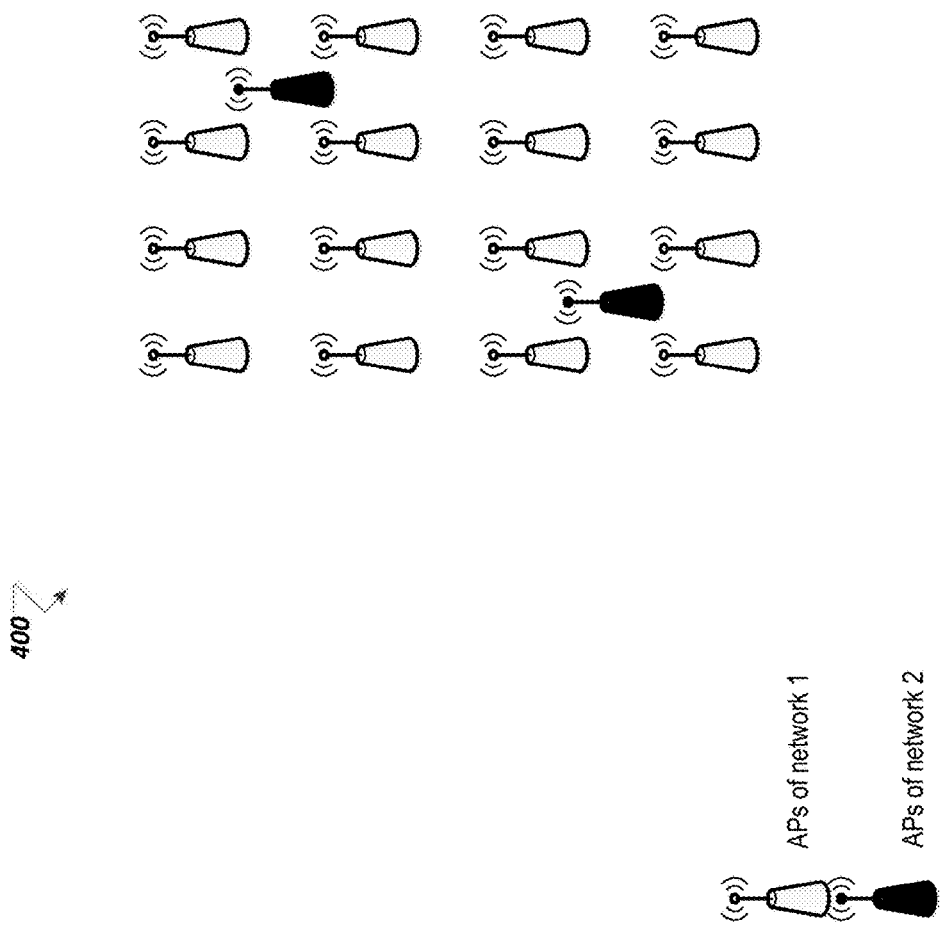
FIG. 4 is an exemplary diagram of two independent co-channel networks.

FIG. 4 is an exemplary diagram 400 of two independent co-channel networks. Network 1 (DMN) has densely deployed APs with a high RSSI distribution and high interference tolerance. Network 2 has more sparsely deployed APs with mixed RSSI distribution and low interference tolerance especially at edges of coverage for each BSS. For the sake of clarity, the diagram 400 does not show STAs associated with each network, which are assumed to be randomly dropped. On example of independent co-channel networks such as those shown in FIG. 4 can include a downtown environment where a service provider's DMN coexists with multiple independent networks (e.g., café, restaurant, urban residential, etc.) or in a mixed office space where multiple tenants deploy independent overlapping networks with different AP densities.

In some examples, the predetermined conditions can be defined for use of non-default OBSS_PD Max/Min to be used only for SR with ongoing transmissions in the same network. For example, setting OBSS_PD Min to −72 or −62 dBm raises the PD channel clearance assessment (CCA) threshold that is used at a given transmit power (Min value applies at TX_PWRref=21 or 25 dBm). In addition, "same network" Max/Min levels allow for optimization of SR gains within a given network (e.g. a DMN). The same network min/max levels can be configured by a network operator according to an expected tolerance of the network's links to interference based on physical topology (e.g., AP density). Also, OBSS_PD can be based on BSS Color or BSSID, which allows SR to be implemented even with legacy transmissions and when SRP is unavailable. A default OBSS_PD Max/Min can be used for SR with other coexisting networks. DMN is polite and provides protection to other networks while still optimizing SR within its network.

In enterprise and carrier networks, it is common for a WLAN network to include a group of physical APs. An extended service set (ESS) can be defined as a logical group of BSS with the same ESSID (aka SSID), and a HESS (Homogeneous ESS) can be defined as a group of physical APs, each having a common configuration, operating a common set of SSIDs, and having common DS connectivity (e.g. each SSID provides access to a VLAN). In the context of spatial reuse (SR), "same network" refers to all co-channel BSS in the same ESS or HESS. For simplicity, the term "intra-ESS" can be used to refer to "same network."

To identify "same network" transmissions, OBSS_PD uses BSS Color or BSSID to classify OBSS transmissions from intra-BSS transmissions. The same approach allows for classifying intra-ESS OBSS from inter-ESS OBSS transmissions by comparing BSS Color or BSSID to an Intra-ESS BSS List configured in AP and STA, which can be included in a list of BSSIDs and/or corresponding BSS colors. In some implementations, the intra-ESS BSS list is relatively small so a probability of BSS color clash is also small. Even if BSS Color clash occasionally occurs, the overall coexistence behavior is still much improved than would be the case if the DMN operator were to set aggressive non-default OBSS_PD levels that apply to all OBSS transmissions.

Figure 5:
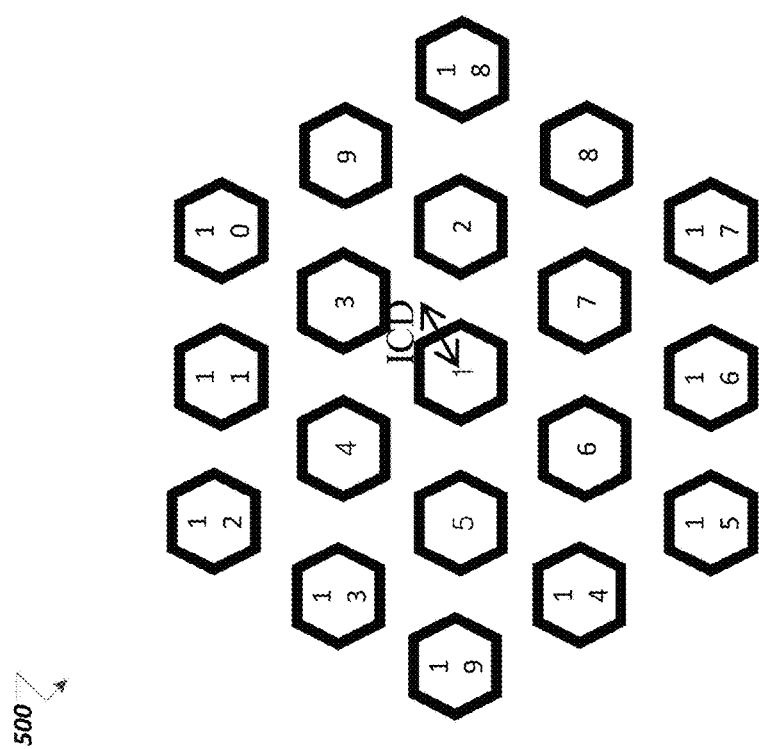
FIG. 5 is an exemplary diagram of an "indoor small BSS"

An intra-ESS BSS list can be implemented in a DMN by configuring each AP with a list of closest co-channel BSS neighbors in the same ESS (or HESS). For example, ongoing transmissions of co-channel BSS in the same ESS on top of which it is beneficial (in terms of SR gains) to perform SR at OBSS_PD Max/Min levels higher than the defaults (e.g. −62/−72 instead of −62/−82). The Intra-ESS BSS list would typically be much smaller than the number of BSS in the ESS. FIG. 5 is an exemplary diagram 500 of an "indoor small BSS" with a high AP density, frequency reuse of 3, and an ICD of 17.3 m. To enable SR at higher OBSS_PD Max/Min levels on top of ongoing transmissions from intra-(H)ESS BSS up to approx. 3*ICD (51.9 m) away, the intra-ESS List includes approximately 16 entries.

MIB variables can be defined for the intra-ESS BSS list and the corresponding OBSS_PD thresholds that are used by the APs. The intra-ESS BSS list contains BSSID and (where available) BSS Color of a BSS in the same ESS/HESS as the configured AP. For example, the MIB variables can be configured as follows:

```
dot11OBSSPDMax              Integer32
dot11OBSSPDMin              Integer32
dot11OBSSPDIntraESSBSSListTable
Sequence of dot11OBSSPDIntraESSBSSListEntry
dot11OBSSPDIntraESSBSSListEntry
{
    dot11BSSID              MacAddress
    dot11BSSColor           Unsigned32
}
```

Regarding STA configuration, a spatial reuse IE includes the intra-ESS BSS list together with the corresponding OBSS_PD thresholds. For example, FIG. 6A is an exemplary diagram of a spatial reuse parameter set element where the intra-ESS BSS list includes zero or more intra-ESS BSS identifier elements. For example, FIG. 6B is an exemplary diagram of an intra-ESS BSS identifier element.

Regarding channel access, a HE STA determines whether a received frame is inter-BSS or intra-BSS using the RXVECTOR parameters (e.g. BSS color . . . ) or MAC address. A frame received by the STA is an intra-BSS frame is one of the following conditions is true <11ax D0.3, 25.2.1>. A HE STA determines whether a received inter-BSS frame is inter-ESS or intra-ESS using the RXVECTOR parameters (e.g. BSS color . . . ) or MAC address, and the Intra-ESS BSS List in dot11OBSSPDIntraESSBSSListTable (for an AP) or announced in Spatial Reuse Parameter Set element by the AP to which the STA is associated (for a non-AP STA). A frame received by the STA is an intra-ESS frame if one of the following conditions is true: the RXVECTOR parameter BSS Color in the received PPDU carrying the frame is equal to a BSS Color in the Intra-ESS BSS List and is not equal to 0; the RA field, TA field or BSSID field of the received frame with the Individual/Group bit forced to the value 0 is equal to a BSSID in the Intra-ESS BSS List; or the RXVECTOR parameter PARTIAL_AID in the received PPDU with the RXVECTOR parameter GROUP_ID equal to 0 is equal to bits [39:47] of a BSSID in the Intra-ESS BSS List.

The following are CCA rules for SR operations. For an intra-ESS case, a HE STA should regard an Inter-BSS and Intra-ESS PPDU with a valid PHY header and that has receiving power/RSSI below the Intra-ESS OBSS PD level used by the receiving STA . . . as not having been received. The Intra-ESS OBSS PD level used by the receiving STA shall be determined according to dot11OBSSPDMax and dot11OBSSPDMin (for an AP) or the OBSS_PD Max/Min offset values announced in Spatial Reuse Parameter Set element by the AP to which the STA is associated (for a non-AP STA), using the OBSS_PD adjustment rule. For the inter-ESS case, a HE STA should regard an Inter-BSS and Inter-ESS (i.e. not identified as Intra-ESS) PPDU with a valid PHY header and that has receiving power/RSSI below the Inter-ESS OBSS PD threshold used by the receiving STA . . . as not having been received. The Inter-ESS OBSS PD level used by the receiving STA is determined according to the default OBSS_PD Max and OBSS_PD Min values (i.e. −62/−82 dBm), using the OBSS_PD adjustment rule.

Intra-ESS OBSS_PD enables operators of IEEE 802.11ax DMNs to optimize Spatial Reuse within their network. DMNs are candidates for large and consistent SR gains, so modes of optimization for these network deployments are justified and are safe and effective to use in dense and mixed legacy deployments. The alternative (regular OBSS_PD alone) is that DMN operators set aggressive non-default OBSS_PD levels that negatively impact other networks. Intra-ESS OBSS_PD enables operators to be more polite to other networks while still optimizing their SR gains. The implementation of the intra-ESS OBSS_PD can become common to regular OBSS_PD intra/inter-BSS detection. For example, ongoing transmissions can be differentiated using BSS color, partial AID, or BSSID. The scheme is complementary to OA-CCA, which provides further spatial reuse gains when spatial reuse parameters (SRP) are available. For example, SR can be optimized between independent networks when interference impact is known.

Figure 7:
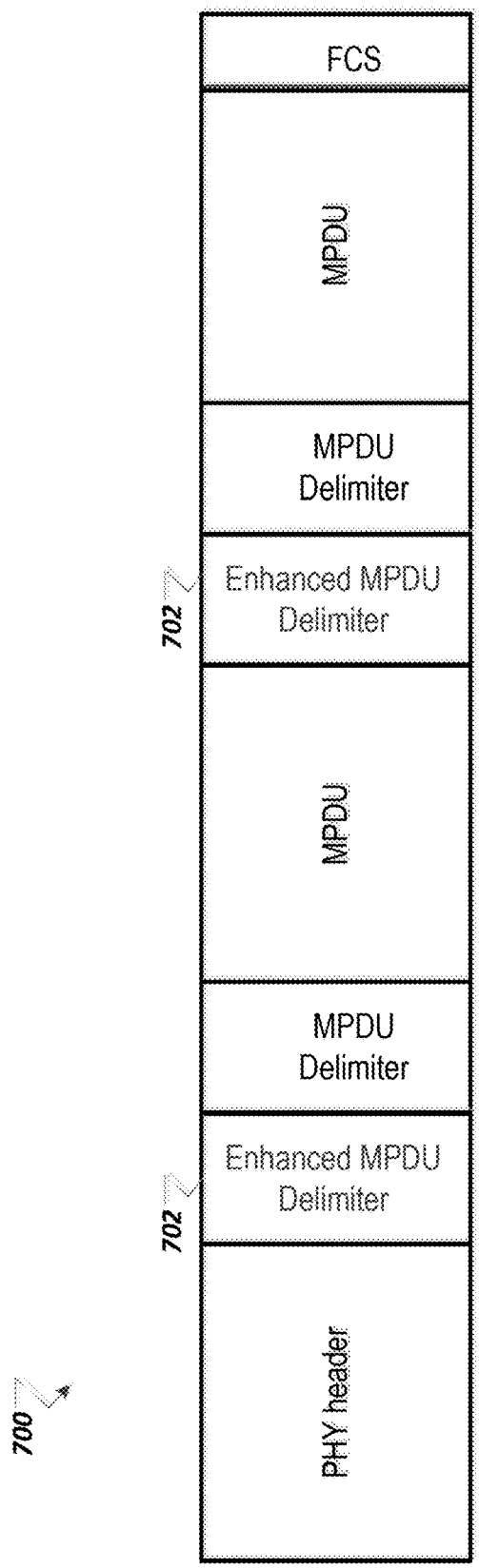
FIG. 7 is an exemplary diagram of a PPDU with an enhanced MAC delimiter.

FIG. 7 is an exemplary diagram of a PPDU 700 with enhanced MAC delimiters 702. The PPDU 700 can have one or multiple enhanced MAC delimiters 702 to for inserting the ESS color information as well as other SR parameters (SRP). In order to assist OBSS STAs for spatial reuse operation or intra BSS STAs to provide power savings, one or multiple enhanced MAC delimiters may be inserted prior to a normal MPDU delimiter or after an MPDU. The enhanced MAC delimiter provides SR information for OBSS STAs. As will be discussed further herein, two FCS field design operations can be implemented for legacy STA coexistence. The enhanced MAC delimiter provides BSS color, ESS color, SRP, etc., which are used when implementing SR. The enhanced MAC delimiter provides duration information for the intra-BSS STA power savings. The normal MAC delimiter allows STAs to read length information of the following MPDU.

Figure 8:
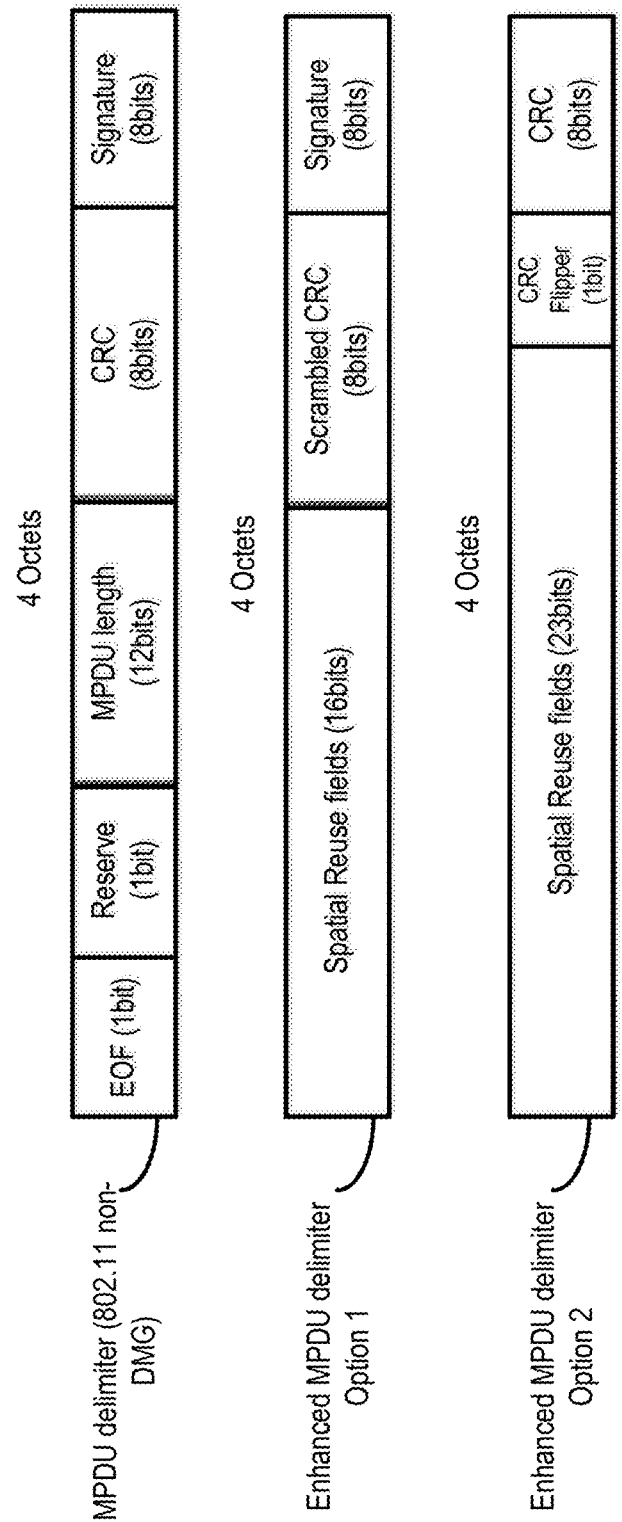
FIG. 8 is an exemplary diagram of exemplary MPDU delimiters.

FIG. 8 is an exemplary diagram of exemplary MPDU delimiters. The enhanced MPDU delimiter is four octets in length, which is the same length as the legacy MPDU delimiter of IEEE 802.11 non-DMG. Therefore, legacy STAs can process the enhanced delimiter as though it were a legacy delimiter, expecting it to match the legacy delimiter format, but the enhanced delimiter format is designed to ensure a failure of the legacy cyclic redundancy check (CRC) when the enhanced delimiter is interpreted as a legacy delimiter.

For enhanced MPDU delimiter option 1, the CRC field (8 bits) is located at the same place (e.g., bit locations) as the CRC field in the legacy delimiter (e.g., third octet from the left). The CRC field protects the first two octets of the delimiter. The CRC field is scrambled so the legacy STAs fail the CRC check and shift to the next 4 octet searching for the next legacy MDPU delimiter. In one example, the calculated CRC field may be inverted as one example of scrambled CRC. In addition, enhanced-delimiter-aware receivers check for both the legacy CRC and the scrambled CRC. If the scrambled CRC matches, then these receivers interpret the delimiter as an enhanced delimiter. The Spatial Reuse fields are contained within the first 16 bits from the left (2 octets).

For enhanced MPDU delimiter option 2, CRC field (8 bits) is located at the fourth octet from the left (i.e. where the signature field is for the 802.11 non-DMG MPDU delimiter). The fourth octet can be transmitted on the air. The CRC field protects the first three octets of the delimiter. The Spatial Reuse fields are contained within the first 16 bits and 7 bits of the third octet. In addition, the $8^{th}$ bit of the third octet (CRC flipper bit) is initially set to 0. If the calculated CRC result of the first two octets happens to be same as the third octet of the delimiter, (assuming a value of 0 for the CRC flipper bit), then the CRC flipper bit is inverted (i.e. changed to 1) to make legacy STAs fail the CRC check.

Figure 9:
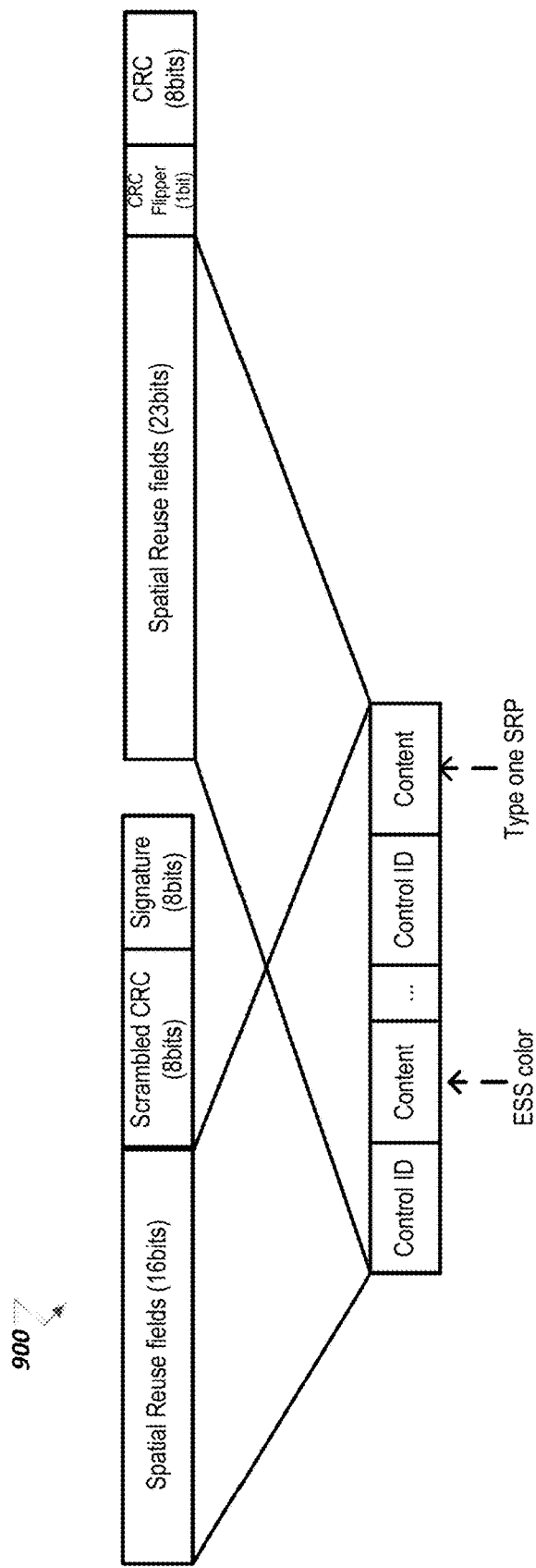
FIG. 9 is an exemplary diagram of spatial reuse fields in an enhanced MPDU delimiter.

FIG. 9 is an exemplary diagram of spatial reuse fields 900 in an enhanced MPDU delimiter. The spatial reuse fields may contain one or multiple spatial reuse fields which include a Control ID field and a content field. The control ID field indicates the type of the immediately following content field. For example, 0: ESS color, 1: Type one Spatial Reuse Parameter, 2: Type two Spatial Reuse Parameter, 3: Both ESS Color and Spatial Reuse Parameter, etc. The content field supports but is not limited to the following types of spatial reuse information: type one spatial reuse parameter, type two spatial reuse parameter, BSS color, ESS color, a combination of SR information, etc.

Figure 10:
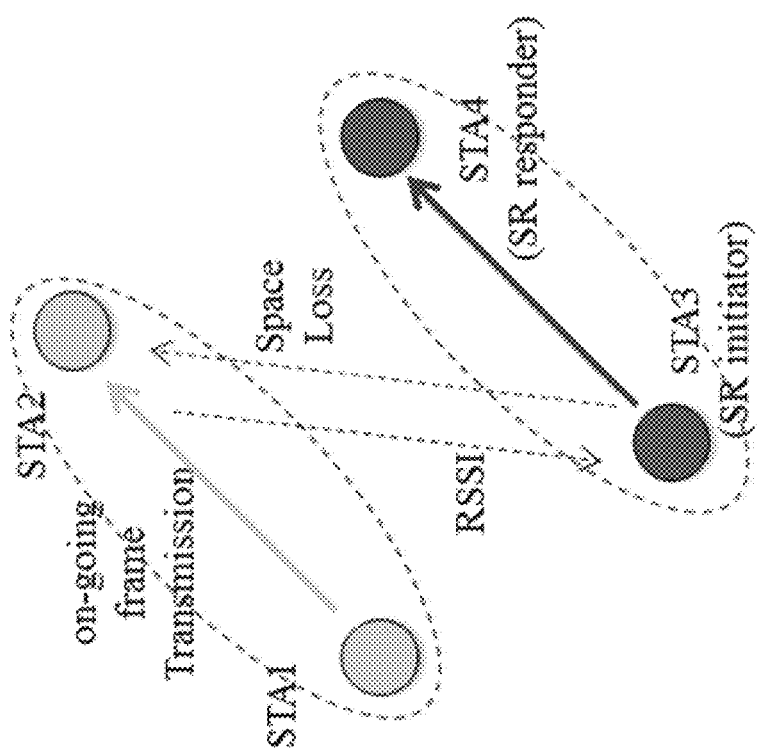
FIG. 10 is an exemplary diagram of SR communications between STAs.

FIG. 10 is an exemplary diagram of SR communications between STAs. For example, STA1 transmits to STA2 and STA1's transmission is detected by STA3 (above the baseline CCA level), STA3 identifies STA1's transmission as an Overlapping BSS (OBSS) transmission and determines whether a spatial re-use transmission to STA4 is acceptable (non-interfering).

For STA3 not to interfere with STA2 reception, TX $PWR_{STA3}$−Space Loss<Acceptable Receiver Interference level$_{STA2}$ where Space loss=TX $PWR_{STA2}$−$RSSI_{STA2@STA3}$.

Type 1 SR parameter (SRP) can be defined as follows:
SRP=TX $PWR_{STA2}$+Acceptable Receiver Interference level$_{STA2}$ The STA3 TX power value can be simplified to:
TX $PWR_{STA3}$<SRP−$RSSI_{STA2@STA3}$ All power levels can be normalized to 20 MHz: power−10*log(BW/20 MHz) where BW=bandwidth of STA3's intended transmission.

Figure 11:
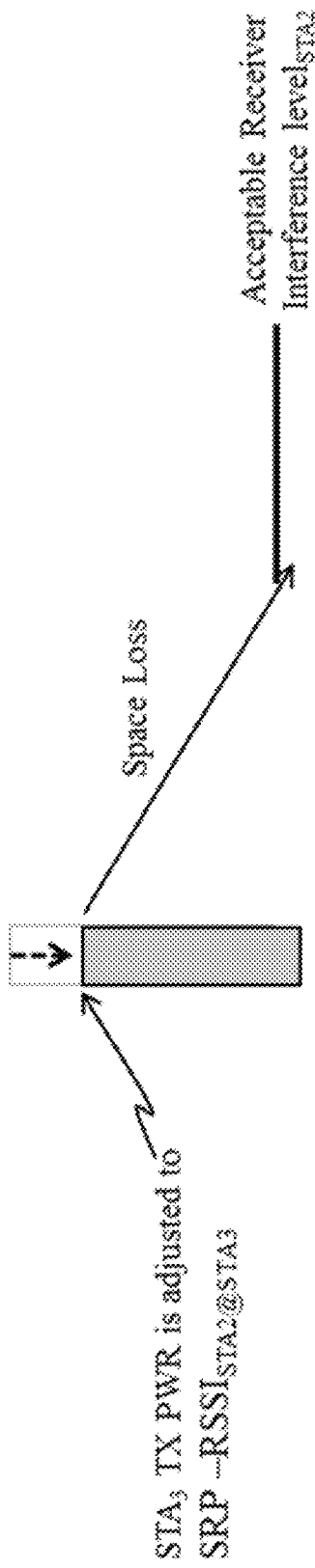
FIG. 11 is an exemplary diagram of STA power modification.

Note that if the STA2 has excess link margin (already at highest MCS), it should add the excess link margin to SRP. This allows STA3 to further raise its transmit power. FIG. 11 is an exemplary diagram of STA power modification.

Referring back to FIG. 10, For STA3 not to interfere with STA2 reception: TX $PWR_{STA3}$−Space Loss$_{STA3\rightarrow STA2}$<TX $PWR_{STA1}$−Space Loss$_{STA1\rightarrow STA2}$ Required SNR Margin for MCS.

Also, note that:
Space loss$_{STA3\rightarrow SAT2}$=TX $PWR_{STA2}$−$RSSI_{STA2@STA3}$
Space Loss$_{STA1\rightarrow STA2}$=TX $PWR_{STA2}$−$RSSI_{STA2@STA1}$
Type 2 SRP can be defined as follows:
SRP_2=TX $PWR_{STA1}$+$RSSI_{STA2@STA1}$−Required SNR Margin for MCS The STA3 TX power value for satisfying the SR condition is:
TX $PWR_{STA3}$<SRP_2−$RSSI_{STA2@STA3}$ All power levels can be normalized to 20 MHz: power−10*log(BW/20 MHz) where BW=bandwidth of STA3's intended transmission.

SRP_2 is carried in the PPDU transmitted by STA1. $RSSI_{STA2@STA1}$ is SNR Margin for MCS (at the transmitter i.e. STA3) is equivalent to acceptable interference level. (at the receiver of the initial transmission, i.e. STA2).

According to the present disclosure, each ESS or HESS has a color value to allow a STA to determine whether a received PPDU is transmitted from a BSS that belongs to the same ESS or HESS as the receiving STA.

Figures 12A, 12B:
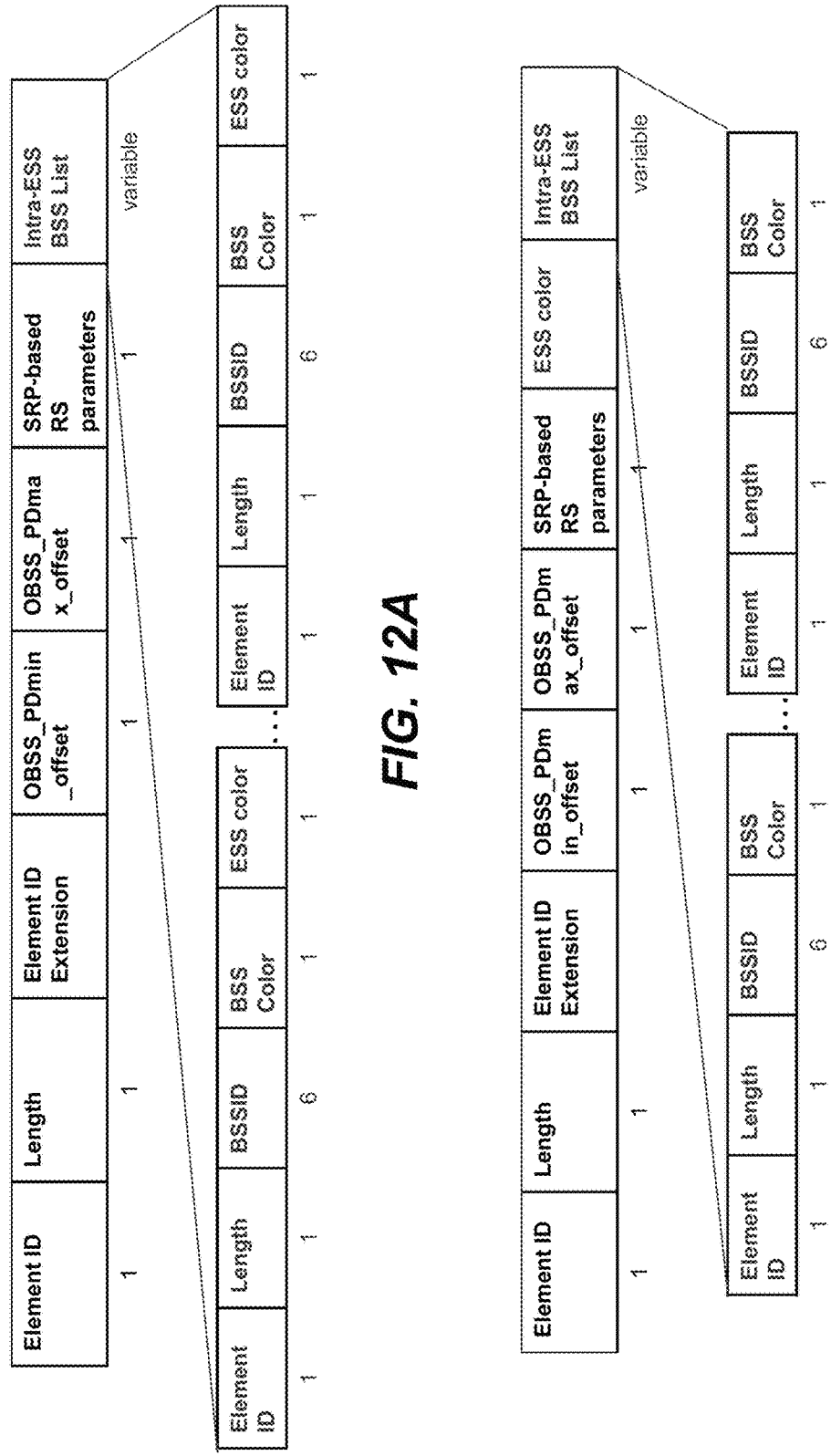
FIG. 12A is an exemplary diagram of an Intra-ESS BSS information element.
FIG. 12B is an exemplary diagram of an Intra-ESS BSS information element.

FIGS. 12A and 12B are exemplary diagrams of Intra-ESS BSS information elements. In FIG. 12A, the Intra-ESS BSS List includes multiple ESS colors associated with various BSS. In FIG. 12B, all of the BSS in the Intra-ESS BSS list are associated with a single ESS color. Other Intra-ESS BSS information element configurations are also possible as would be recognized by those skilled in the art.

The invention claimed is:
1. A communication device comprising:
circuitry configured to
identify one or more basic service sets (BSSs) that include at least one access point (AP) and one or more corresponding stations (STA) associated with an extended service set (ESS) based on one or more location or configuration parameters,
determine ESS color information associated with the one or more BSSs of the ESS, and
transmit a physical layer convergence protocol (PLCP) protocol data unit (PPDU) to the one or more BSSs that includes an enhanced media access control (MAC) protocol data unit (MPDU) delimiter indicating at least the ESS color information and at least one spatial reuse parameter (SRP) including a transmit power setting based on predetermined tolerance levels of at least one of the one or more corresponding STAs.

2. The communication device according to claim 1, wherein the enhanced MPDU delimiter is undetectable by a legacy STA that is not configured for spatial reuse.

3. The communication device according to claim 1, wherein the enhanced MPDU delimiter further indicates BSS color information.

4. The communication device according to claim 2, wherein at least part of the enhanced MPDU delimiter is obscured by a cyclical redundancy check (CRC) code that causes the legacy device to fail a CRC check performed on the enhanced MPDU delimiter.

5. The communication device according to claim 1, wherein the at least one SRP includes a transmit power set based on received signal strength indicators (RSSIs) of at least some of the one or more corresponding STAs.

6. The communication device according to claim 1, wherein each ESS and each BSS has a different color value associated therewith.

7. A method of operating a communication device, comprising:
identifying, with circuitry, one or more basic service sets (BSSs) that include at least one access point (AP) and one or more corresponding stations (STA) associated with an extended service set (ESS) based on one or more location or configuration parameters;
determining, with the circuitry, ESS color information associated with the one or more BSSs of the ESS; and
transmitting, with the circuitry, a physical layer convergence protocol (PLCP) protocol data unit (PPDU) to the one or more BSSs that includes an enhanced media access control (MAC) protocol data unit (MPDU) delimiter indicating at least the ESS color information and at least one spatial reuse parameter (SRP) including a transmit power setting based on predetermined tolerance levels of at least one of the one or more corresponding STAs.

8. The method according to claim 7, wherein the enhanced MPDU delimiter is undetectable by a legacy STA that is not configured for spatial reuse.

9. The method according to claim 7, wherein the enhanced MPDU delimiter further indicates BSS color information.

10. The method according to claim 8, wherein at least part of the enhanced MPDU delimiter is obscured by a cyclical redundancy check (CRC) code that causes the legacy device to fail a CRC check performed on the enhanced MPDU delimiter.

11. The method according to claim 7, wherein the at least one SRP includes a transmit power set based on received signal strength indicators (RSSIs) of at least some of the one or more corresponding STAs.

12. The method according to claim 7, wherein each ESS and each BSS has a different color value associated therewith.

13. A non-transitory computer-readable medium encoded with computer-readable instructions thereon that, when executed by processing circuitry, cause the processing circuitry to perform a method comprising:
- identifying one or more basic service sets (BSSs) that include at least one access point (AP) and one or more corresponding stations (STA) associated with an extended service set (ESS) based on one or more location or configuration parameters;
- determining ESS color information associated with the one or more BSSs of the ESS; and
- transmitting a physical layer convergence protocol (PLCP) protocol data unit (PPDU) to the one or more BSSs that includes an enhanced media access control (MAC) protocol data unit (MPDU) delimiter indicating at least the ESS color information and at least one spatial reuse parameter (SRP) including a transmit power setting based on predetermined tolerance levels of at least one of the one or more corresponding STAs.

14. The non-transitory computer-readable medium according to claim 13, wherein the enhanced MPDU delimiter is undetectable by a legacy STA that is not configured for spatial reuse.

15. The non-transitory computer-readable medium according to claim 13, wherein the enhanced MPDU delimiter further indicates BSS color information.

16. The non-transitory computer-readable medium according to claim 14, wherein at least part of the enhanced MPDU delimiter is obscured by a cyclical redundancy check (CRC) code that causes the legacy device to fail a CRC check performed on the enhanced MPDU delimiter.

17. The non-transitory computer-readable medium according to claim 13, wherein the at least one SRP includes a transmit power set based on received signal strength indicators (RSSIs) of at least some of the one or more corresponding STAs.

18. The non-transitory computer-readable medium according to claim 13, wherein each ESS and each BSS has a different color value associated therewith.

* * * * *